United States Patent
Libfeld et al.

(10) Patent No.: US 9,747,353 B2
(45) Date of Patent: Aug. 29, 2017

(54) DATABASE CONTENT PUBLISHER (71) Applicants: Zahi Libfeld, Ra'anana (IL); Itay Assraf, Ra'anana (IL)

(72) Inventors: Zahi Libfeld, Ra'anana (IL); Itay Assraf, Ra'anana (IL)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 14/101,470

(22) Filed: Dec. 10, 2013

(65) Prior Publication Data
US 2015/0161235 A1  Jun. 11, 2015

(51) Int. Cl.
G06F 7/00 (2006.01)
G06F 17/00 (2006.01)
G06F 17/30 (2006.01)

(52) U.S. Cl.
CPC ................. G06F 17/3056 (2013.01)

(58) Field of Classification Search
CPC ......... G06F 17/30905; G06F 17/30595; G06F 17/30598; G06F 17/30604; G06F 17/30292; G06F 17/30294; G06F 17/30297
USPC .............. 707/607, 791, 792, 802, 805, 944; 705/346, 348, 14.17, 14.25
See application file for complete search history.

(56) References Cited

U.S. PATENT DOCUMENTS

| | | | | |
|---|---|---|---|---|
| 5,867,667 A | * | 2/1999 | Butman | G06F 17/3089 707/E17.116 |
| 5,870,562 A | * | 2/1999 | Butman | G06F 17/3089 707/E17.116 |
| 5,870,744 A | * | 2/1999 | Sprague | G06Q 10/10 379/88.17 |
| 5,875,180 A | * | 2/1999 | Wiedeman | H04B 7/18513 370/320 |
| 5,880,446 A | * | 3/1999 | Mori | G06Q 20/04 235/380 |
| 6,085,168 A | * | 7/2000 | Mori | G06Q 20/00 705/17 |
| 6,105,007 A | * | 8/2000 | Norris | G06Q 20/10 705/35 |
| 7,206,789 B2 | * | 4/2007 | Hurmiz | G06F 17/30286 |
| 7,389,341 B2 | * | 6/2008 | Cornelius | G06F 11/0715 370/242 |
| 7,403,933 B2 | | 7/2008 | Arend et al. | |
| 8,156,137 B2 | * | 4/2012 | Aakolk | G06F 17/30377 707/769 |

(Continued)

FOREIGN PATENT DOCUMENTS

EP  1321859 A1  6/2003
WO  WO0239353 A1  5/2002

*Primary Examiner* — Daniel Kuddus (57) ABSTRACT

Various embodiments of systems and methods to publish database content as service for accessing business data are described herein. In one aspect, a business transaction instantiated by a user is executed on an application server. During the execution, at least one database table of a plurality of database tables and at least one database relationship associated with the at least one database table are identified. In another aspect, a data structure model is automatically generated based on the identified at least one database table and at least one database relationship. In yet another aspect, data from the at least one database table is exposed to be consumed as a service based on the data structure model.

14 Claims, 6 Drawing Sheets

(56) References Cited

U.S. PATENT DOCUMENTS

| | | | |
|---|---|---|---|
| 8,176,137 B2* | 5/2012 | Cornelius | G06F 8/60 709/207 |
| 8,230,329 B2 | 7/2012 | Rohan et al. | |
| 8,364,814 B2 | 1/2013 | Ewe et al. | |
| 8,412,716 B2 | 4/2013 | Stoitsev et al. | |
| 8,417,593 B2 | 4/2013 | Schmitt et al. | |
| 8,423,418 B2 | 4/2013 | Hald et al. | |
| 2003/0115190 A1* | 6/2003 | Soderstrom | G06F 17/3056 |
| 2005/0010454 A1 | 1/2005 | Falk et al. | |
| 2005/0108271 A1* | 5/2005 | Hurmiz | G06F 17/30286 |
| 2005/0198618 A1* | 9/2005 | Lalonde | G06F 8/34 717/110 |
| 2006/0212559 A1* | 9/2006 | Turnbull | G06F 17/3056 709/223 |
| 2007/0100711 A1* | 5/2007 | Stroh | G06Q 10/087 705/28 |
| 2007/0156842 A1* | 7/2007 | Vermeulen | G06F 17/30212 709/217 |
| 2007/0169016 A1* | 7/2007 | Aakolk | G06F 8/20 717/136 |
| 2008/0015919 A1 | 1/2008 | Busse et al. | |
| 2008/0161940 A1* | 7/2008 | Gerwens | G06Q 10/06 700/4 |
| 2009/0248547 A1* | 10/2009 | Doenig | G06Q 10/06 705/28 |
| 2010/0174731 A1* | 7/2010 | Vermeulen | G06F 17/30212 707/758 |
| 2011/0126261 A1* | 5/2011 | Maes | G06F 21/6218 726/1 |
| 2011/0161293 A1* | 6/2011 | Vermeulen | G06F 17/30212 707/626 |
| 2012/0158642 A1* | 6/2012 | Ebrahimi | G06F 8/30 707/600 |
| 2012/0246115 A1 | 9/2012 | King et al. | |
| 2012/0310690 A1 | 12/2012 | Sidhu et al. | |
| 2013/0159378 A1 | 6/2013 | Misovski et al. | |
| 2013/0218911 A1* | 8/2013 | Li | G06F 21/604 707/754 |
| 2014/0075571 A1* | 3/2014 | Jackson | G06F 17/30292 726/28 |

\* cited by examiner

DATABASE CONTENT PUBLISHER

SUMMARY

Systems and methods to publish database content as service for accessing business data are described herein. In one aspect, a business transaction instantiated by a user is executed on an application server. During the execution, at least one database table of a plurality of database tables and at least one database relationship associated with the at least one database table are identified. In another aspect, a data structure model is automatically generated based on the identified at least one database table and at least one database relationship. In yet another aspect, data from the at least one database table is exposed to be consumed as a service based on the data structure model.

BACKGROUND

The dynamic business environment in which today's enterprises operate require providing various services for managing business data. Often, the business enterprises have to enhance the capabilities and flexibility of their core systems by developing additional services for accessing business related information. For example, such services may be using for creating specific customized reporting in response to specific business case. One of the most powerful techniques to building such additional services is to provide direct access to various business objects through so called "gateway" tools (e.g., NetWeaver Gateway provided by SAP AG). Generally, such tools include various pre-programmed modules that are using standard protocols for accessing business data, such as Remote Function Call (RFC), Business Application Programming Interface (BAPI), etc. The pre-programmed modules provide access to business data encompassed by specific business objects, like, "customer" business object, "sales order" business object, etc. Thus, the business object data may be exposed as a service to external applications, e.g., using broadly adopted flexible formats for web access, such as Open Data protocol (OData™), Google Data protocol (GData™), etc. However, in order to enhance the data already exposed, e.g., by providing access to additional business objects, or to additional data of the already included business objects, some of the existing modules of the "gateway" tools have to be pre-programmed, or new modules have to be developed.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for database content publisher are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
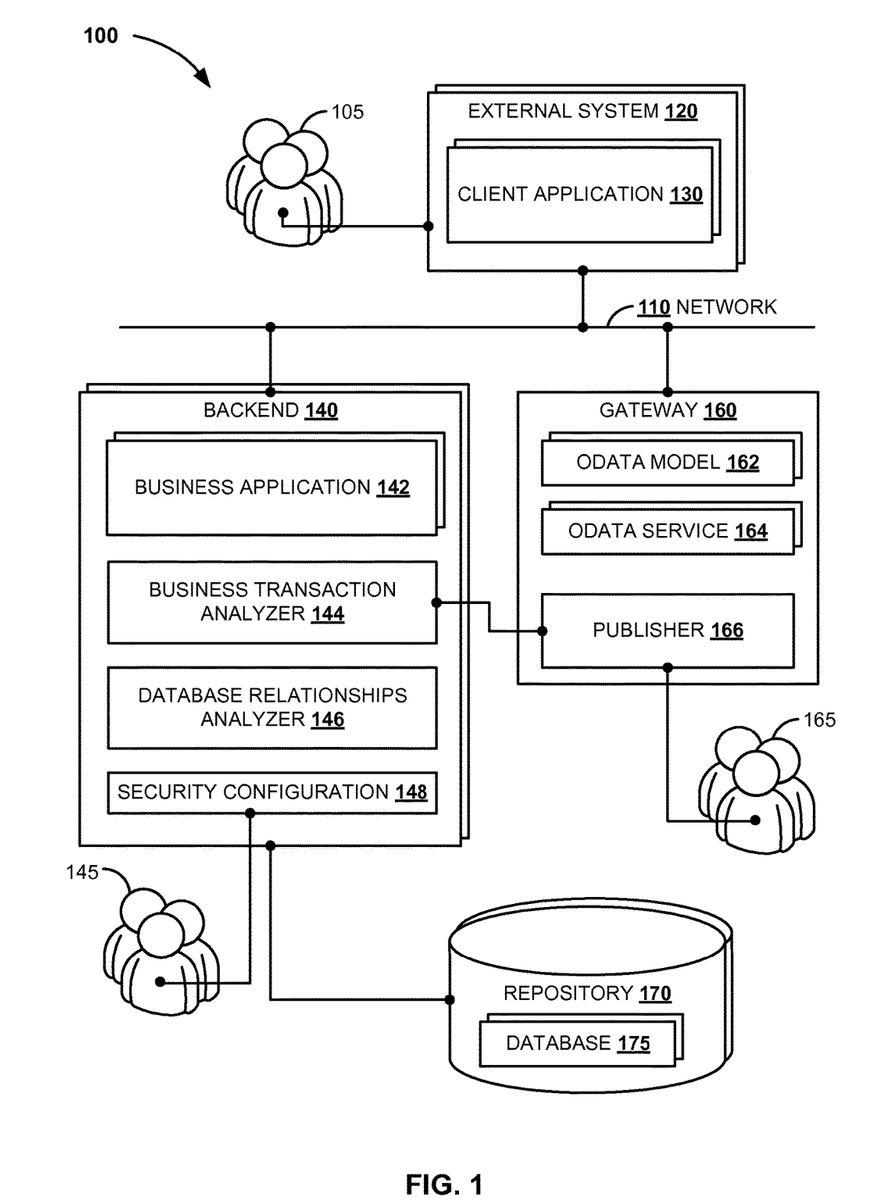
FIG. 1 is a block diagram illustrating a system environment publishing database content, according to one embodiment.

FIG. 1 shows system environment 100 for dynamically publishing database content, according to one embodiment. The illustrated example system environment 100 implements the classic client-server architecture, where one or more users 105 operate on one or more client systems, e.g., external system 120 to access, over network 110, one or more services provided by one or more server systems, e.g., backend 140. The external system 120 may execute one or more client applications 130 for requesting and consuming the one or more services provided by the backend 140. The one or more client applications 130 may receive various business requests relating to the one or more services as available at the backend 140. For example, if a service provides access to specific data, the client application may request generating various reports based on the data exposed through the service.

In one embodiment, the communication between the client applications 130 on the external system 120 and the services provided at the backend 140 may be based on the Open Data Protocol (OData). The OData, originally developed by Microsoft Corp., is currently a broadly adopted open source solution for exchanging data over the Internet. Typically, data is hosted by server systems similar to backend 140. Users can access and, eventually, manipulate the data through client systems, e.g., external system 120. An end point on a server system (e.g., backend 140) may also be referred as a service.

OData is based on Hypertext Transfer Protocol (HTTP), which ensures flexibility and efficient integration between the client and the server systems. Once a server exposes data via the OData protocol, it can be consumed by a client computer system regardless the implemented technology as long as it supports the HTTP stack. Applications that run on the client system and access the data as exposed at the server endpoint are usually called consumers. Applications that run on a server system and expose data via a server endpoint (e.g., service) using the OData are typically called producers or sources of data. The OData also provides metadata of the data exposed by the producers, including data structure, data types, dependencies, etc.

The OData enables the creation of HTTP-based data services, which allow resources identified using Uniform Resource Identifiers (URIs) and defined in an abstract data model, to be published and edited by Web clients using simple HTTP messages. OData is intended to be used to expose and access information from a variety of sources including, but not limited to, relational databases, file systems, content management systems, and traditional Web sites.

The backend 140 may execute one or more business applications 142, such as Enterprise Resource Planning (ERP) system, Customer Relationship Management (CRM) system, Supplier Relationship Management (SRM) system, etc. Typically, in a company, the business applications 142 operate upon a number of various business objects corresponding to the activities performed in the company that are tracked and/or automated with the help of the business applications 142. For example, an ERP and a CRM system may operate, independently or in a coordinated fashion, upon a "customer" business object by generating multiple instances of the object corresponding to the customers of the company to store customer related data.

Various dependencies between the data of the same or different business objects are defined or reflected, and maintained by the business applications 142. For example, different data fields of the "customer" business object may be in certain dependency or relation, e.g., a single customer may have one full name and more than one phone numbers, addresses, etc. Further, an instance of a "sales order" object corresponding to a sales order processed by the company is associated with a particular customer requesting the sales order, e.g., associated with a particular instance of the "customer" business object. The business applications 142 generate and/or manipulate business data associated with the underlying business objects by executing business transactions, such as, registering new customer, generating new sales order, processing a sales order, etc. The business applications 142 may store the data of the different instances of the underlying business objects at repository 170 in database 175.

In one embodiment, data associated with the business objects may be exposed to be consumed by the external systems 120 by one or more additional applications, internal or external to the backend 140. Gateway 160 is one example of such application that operates as a data producer exposing data associated with the business objects underlying the business applications 142. In one embodiment, the gateway 160 is implemented as a plug-in to the backend 140. The gateway 160 may be configured or programmed to access specific business data at specific business objects via RFCs and/or BAPIs. In one embodiment, the gateway 160 includes OData model 162 and OData service 164 modules to generate OData model of the accessed business data and to expose the model as a service via the OData.

Often, a user or users may need access to business data which is not exposed through the pre-programmed or pre-configured applications, e.g., producers. Typically, the user or users requesting access to specific business data are not familiar with the exact structure of the business objects, and with the applicable data fields associated with the requested data. Thus, besides the additional business object interface programming for enabling access to the needed data, analyses and/or consultations would be necessary to identify the pertinent data fields of the relevant business objects.

However, in the described scenario, the user or users usually have notion about the business functionality or business transactions operating over the data that need to be accessed as a service. According to one embodiment, a user may trigger the publishing of the needed specific business data as a result of executing one or more business transactions relevant to these data, without additional programming. For example, if the user needs access to data relevant to purchase orders, the access may be generated by creating a new purchase order, or processing an existing purchase order, without knowing the exact structure of the "purchase order" business object. The execution of the business transactions responsible for creating and/or processing the purchase order involves transferring the purchase order related data to and from a database (e.g., database 175 at repository 170). In one embodiment, the server system (e.g., backend 140) is operable to identify the data structures involved in persisting the data related to the executed business transactions, and to expose this data as a service, e.g., via OData. Thus, the business data is exposed at a lower layer composed by the database, instead of at the layer composed by the business objects.

In one embodiment, the gateway 160 includes publisher 166 to dynamically expose business data stored at the database 175. The publisher 166 may be integrated as part of the gateway enhancing its functionality. The publisher 166 may be alternatively implemented as a standalone application, internal or external to the backend 140. The publisher may use OData model 162 and OData service 164 modules of gateway 160 to generate OData™ model for the data stored at the database that needs to be exposed. When one of the users 105 initiates a business transaction through one or more of the client applications 130, publisher 166 may call business transaction analyzer 144 and the database relationships analyzer 146 modules at the backend to identify the data structures of the database 175 accessed by the business transaction. Depending on the implementation, the publisher may be instantiated or triggered to call the business transaction analyzer 144 by running the business transaction in a special mode, e.g., selected by the user of users 105. Alternatively, the publisher 166, and respectively, the business transaction analyzer 144 may be triggered by one or more gateway users 165. In one embodiment, the business transaction is initiated directly at the publisher 166 by gateway user 165.

Publisher 166 may expose the business data pertinent to the executed business transaction as an OData based service based on access rights of the users (e.g., client application users 105 and/or gateway users 165), or, the role assigned to the user initiating the business transaction. The access rights of the users, formed, for example, by the different roles and the assignments to the different roles, may be configured by one or more backend administrators 145. The access rights, roles and authorizations could be configured at security configuration module 148 in the backend 140, and could determine the access rights of the users to the business data of the business applications 142 in general. In one embodiment, the access rights may be defined on database level, on database table level, and/or even on database table field level.

In one embodiment, the publisher 166 is responsible to handle the process of exposing the relevant business data. Gateway user 165 may The publisher 166 calls the business transaction analyzer 144, and consequently or simultaneously, the database relationships analyzer 146. As a result, the publisher 166 gets back the relevant data structure entities (e.g., database tables) with the associations or dependencies between them (e.g. relationships), together with the database tables limitations. In one embodiment, the publisher 166 may also enable a gateway user or users 165 to adjust a data model generated based on the received data structure, and to generate an OData based model and service for accessing the data directly on database level, e.g., by using OData model 162 and OData service 164 modules of the gateway 160.

In one embodiment, the business transaction analyzer 144 is responsible to identify the database table or tables that participate in the process of executing the initiated business transaction. Further, the business transaction analyzer 144 may call the database relationships analyzer 146 with the identified database tables to receive the pertinent database relationships. In addition to identifying the relationships, the database relationships analyzer 146 may be responsible to identify and return the database tables access limitations based on the authorizations as established by the backend administrator 145 through the security configuration module 148. The database relationships analyzer 146 may analyze the metadata of the identified database tables for elements such as dependencies, relationships, private keys, foreign keys, stored procedures, etc.

Security configuration 148 may be responsible to create and/or to check security configuration definitions, and to verify whether a database table of the identified database tables is allowed to be exposed or not, e.g., to the requesting user. In addition, the security configuration 148 could check limitations or rights applied to specific roles for specific fields in the database table, and even possibly for specific values. In one embodiment, the security mechanism pertinent to the dynamic publishing of database content will be implemented by creating specific roles and enabling the backend administrator 145 to control what data can be exposed and to whom. The security configuration definitions may be provided as a data structure matching specific functionalities and/or database structures to specific roles and/or users. An example of such data structure is a security configuration table. The data access could be arranged based on such configuration table, even without using programming to define the different roles and access rights.

In one embodiment, the data access through pre-programmed services via business object interfaces such as BAPIs, RFCs, etc., could be authorized on system level, e.g., when a user can access the producer system or application, access to the data is granted based on the definition of the relevant interface, e.g., BAPI or RFC. However, it may be more dangerous to allow a user of client application users 105 (or a user of gateway users 165) generate a server endpoint or a service exposing low level (e.g., directly at a database) business data. It could be even more dangerous to allow the other client application users 105 accessing the data published through such dynamically created service without robust, database level security mechanism in place. In one embodiment, the backend administrator does not define and/or maintain special access rights for publishing data. For example, if a requesting user is allowed to access a table remotely, this is sufficient to allow creating the service model based on the table, and expose the content of the table through the service, e.g., via OData.

Figure 2:
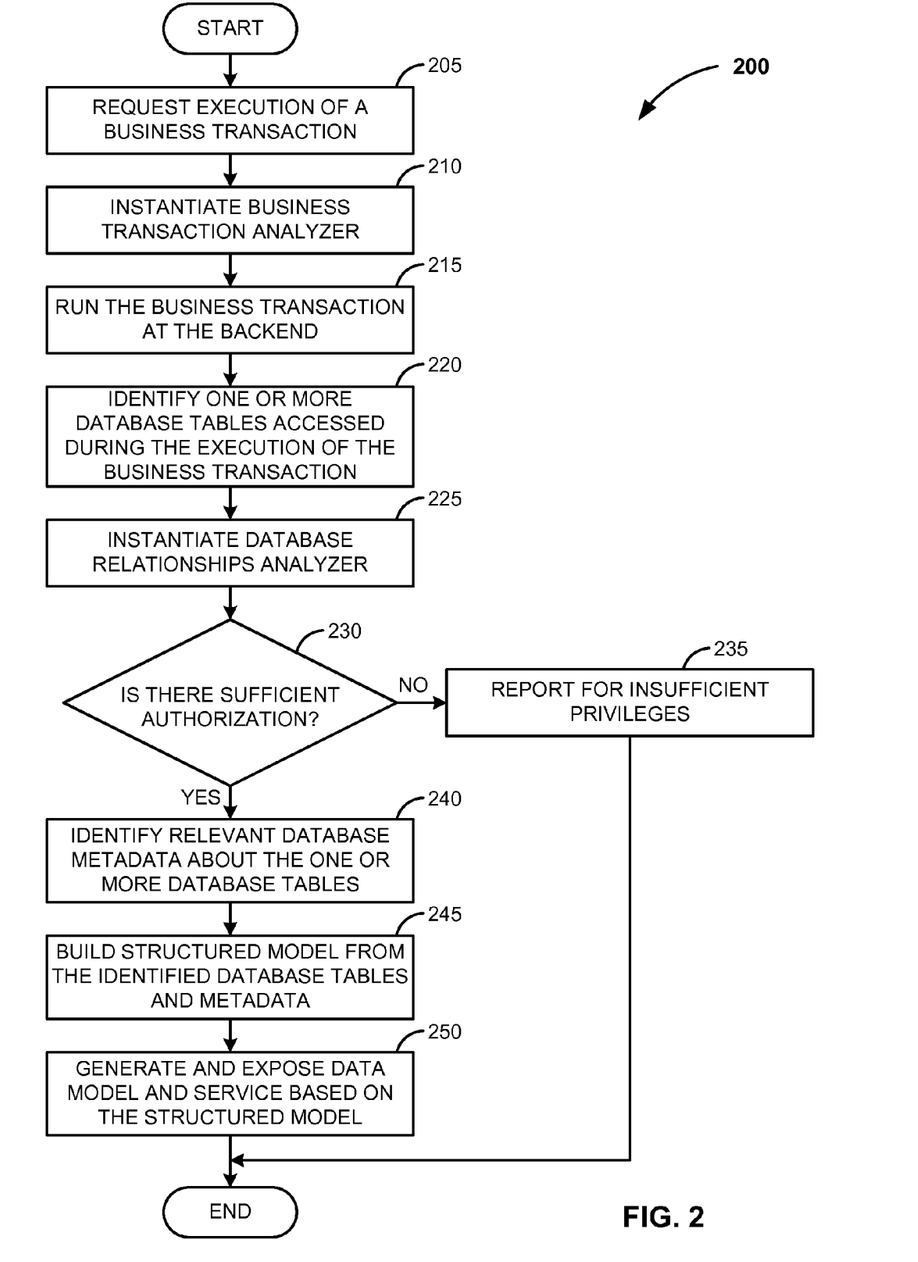
FIG. 2 is a flow diagram illustrating a process to publish database content, according to one embodiment.

FIG. 2 shows process 200 to publish database content, according to one embodiment. At 205, a user may request an execution of a business transaction at a backend system. For example, the user may request processing of a sales order. The request could be launched by opening, at a client device (e.g., in a web browser), an initial screen of a graphical user interface of a business application (e.g., an ERP system). The initial screen may allow lookup for a sales order to be processed. Upon selecting the sales order, a business transaction corresponding to the processing of the sales order could be initiated. The processing of the business order could include navigation through several screens of the GUI, corresponding to different stages of the business transaction, where the user may provide various input to accomplish the processing of the sales order. In one embodiment, the business transaction is initiated by a user of a data producer application, e.g., a publisher, which is responsible for publishing the pertinent database content. The publisher may be entry point to receiving and handling the request for business transaction execution.

At 210, an additional application or service is instantiated at the backend, e.g., a business transaction analyzer, to run the business transaction (at 215) and to identify the database tables involved in the execution of the business transaction (at 220). In one embodiment, the business transaction analyzer runs in communication with an execution of the business transaction handled by one or more business applications running in the backend system. The system or application handling the execution of the business transaction may call the business transaction analyzer as a separate module or as an embedded functionality or service in the backend runtime environment. The business transaction analyzer may monitor the execution of the business transaction and create a list of the involved database tables. In one embodiment, the business transaction analyzer may capture the database tables involved in the execution of one or more business transactions requested by one or more different users.

After identifying one or more database tables accessed during the execution of the business transaction, process 200 continues at 225 with instantiating a database relationship analyzer, according to one embodiment. The database relationship analyzer may be another application or a service running at the backend. Alternatively, the database relationship analyzer may be embedded, e.g., as a functional module, in another application or service, such as the business transaction analyzer or other. The business transaction analyzer may call the database relationship analyzer to find the relevant database tables as identified in the database. Further, the business transaction analyzer may check, or use the database relationships analyzer to check, whether there are access limitations associated with the tables, e.g., based on role configurations. Based on the access limitations, at 230 it is verified whether the user who requested the execution of the business transaction has sufficient authorization to access data in the identified database tables. In case the user does not have such authorization, insufficient privileges may be reported at 235.

At 240, after verifying that the user has sufficient authorization (at 230), database metadata is identified relevant to the one or more database tables. The metadata may include information about existing relationships between the identified database tables, foreign keys, private keys, indexes, stored procedures, etc. The database relationships analyzer may check the database metadata relevant to the identified database tables in order to build associations and/or dependencies between the tables, and even between the attributes and/or fields.

At 245, a structured model is built based on the identified database tables and metadata. In one embodiment, the business transaction analyzer may return the metadata information provided by the database relationships analyzer to the publisher to build the model. The publisher may build the model based on the list of database tables, the established authorization or security restraints, and the identified metadata (e.g., definitions, data types, dependencies, etc.). In one embodiment, the structure model may be based on database tables, relationships and metadata identified during the execution of more than one business transactions. For example, the user may execute several transactions, and the business transaction analyzer may return the involved database structures and metadata separately for each transaction or combined.

At 250, a data model and a service based on the built structured model are generated to expose data from the identified database tables. In one embodiment, the data model represents abstract entity data model (EDM) metadata underlying the OData service. Entities may represent different data objects, e.g., tables or parts of tables (such as 'customer', 'sales order', and so on), consisting of named and typed properties and a key. The entity key (for example, 'CustomerId' or 'OrderId') is a fundamental concept for uniquely identifying instances of the data objects and allowing relationships between entities. Associations define the relationships between two or more entities Navigation properties are bound to a specific association and can be used to refer to associations of an entity.

Based on the executed business transaction, a set of database tables is identified. Further, some data structures or tables may be removed, or additional data structures or tables may be included to the set (e.g., using the database relationships analyzer), and only then build the structured model. Once the service for provisioning access to data stored in the database, e.g., for dynamically publishing database content, is generated, it could be further configured or adjusted.

Figure 3:
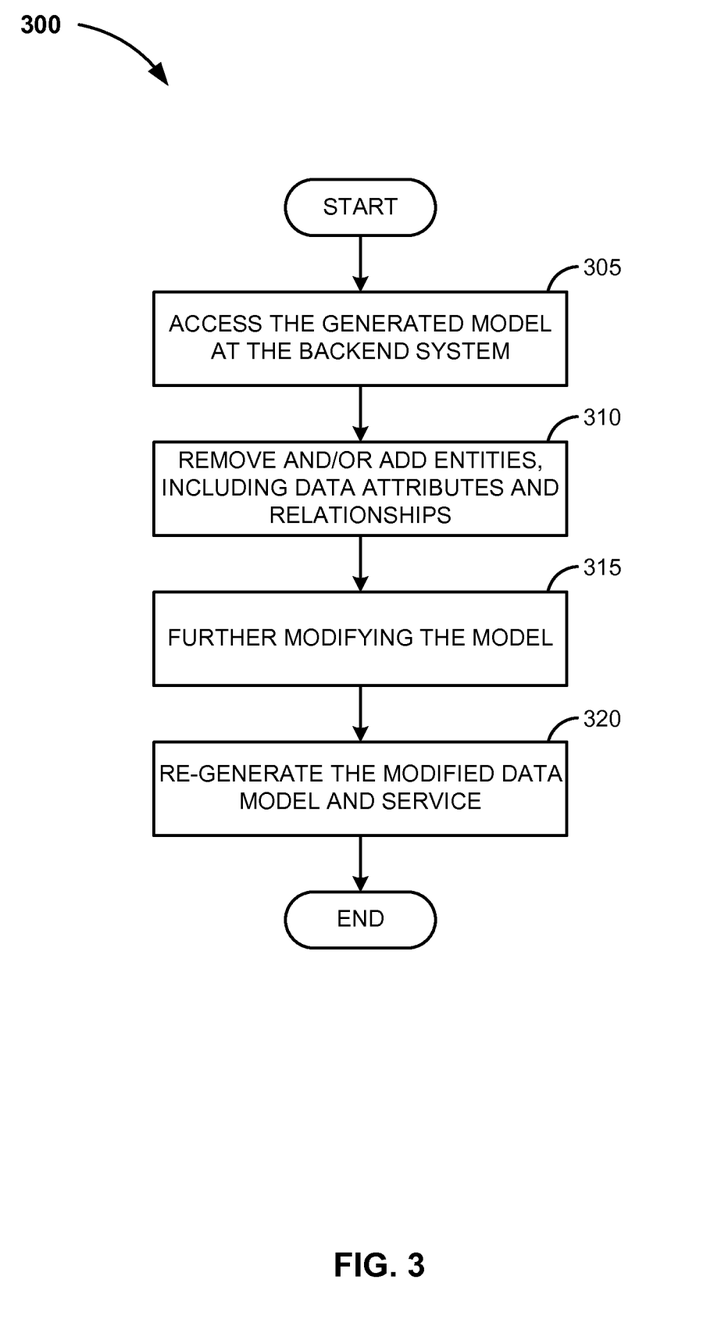
FIG. 3 is a flow diagram illustrating a process to apply changes to a backend service for exposing database content, according to one embodiment.

FIG. 3 shows process 300 to applying changes to a backend service for exposing database content, according to one embodiment. According to process 300, a user may access the generated model of the service (e.g., the structured model and/or the OData model). In one embodiment, the user may access the model where the model is generated, e.g., at a gateway component. The gateway may be implemented as a separate server component, or deployed at a backend system. For example, the user may access the application or the service generating the model, e.g., the publisher.

Using functionality provided by the publisher, the user may manipulate the service model, at 310, e.g., by removing or adding data fields, removing or adding relationships, etc. In one embodiment, the user may select a subset of the database structures included in the model based on the executed business transaction. Further, at 315, the user may continue with the modification of the service model by, for example, renaming data attributes generating or changing functional dependencies within the service model, defining or modifying different data restrictions, etc. In one embodiment, the user may combine more than one service models generated based on business transactions into one model. The user may also split one service model into more than one service models. Process 300 ends at 320 with re-generating the service model to implement the modifications in the service.

Once the service for accessing database data is generated automatically based on the executed business transactions, e.g., without writhing program code, and published at the backend, the service is available for utilization by various client applications. For example, when the service is based on OData, any consumer application supporting the HTML stack can execute client applications capable of communicating with the service, and hence, accessing the exposed database content. Such applications may be run on client devices, like, personal computers, mobile devices, etc.

Figure 4:
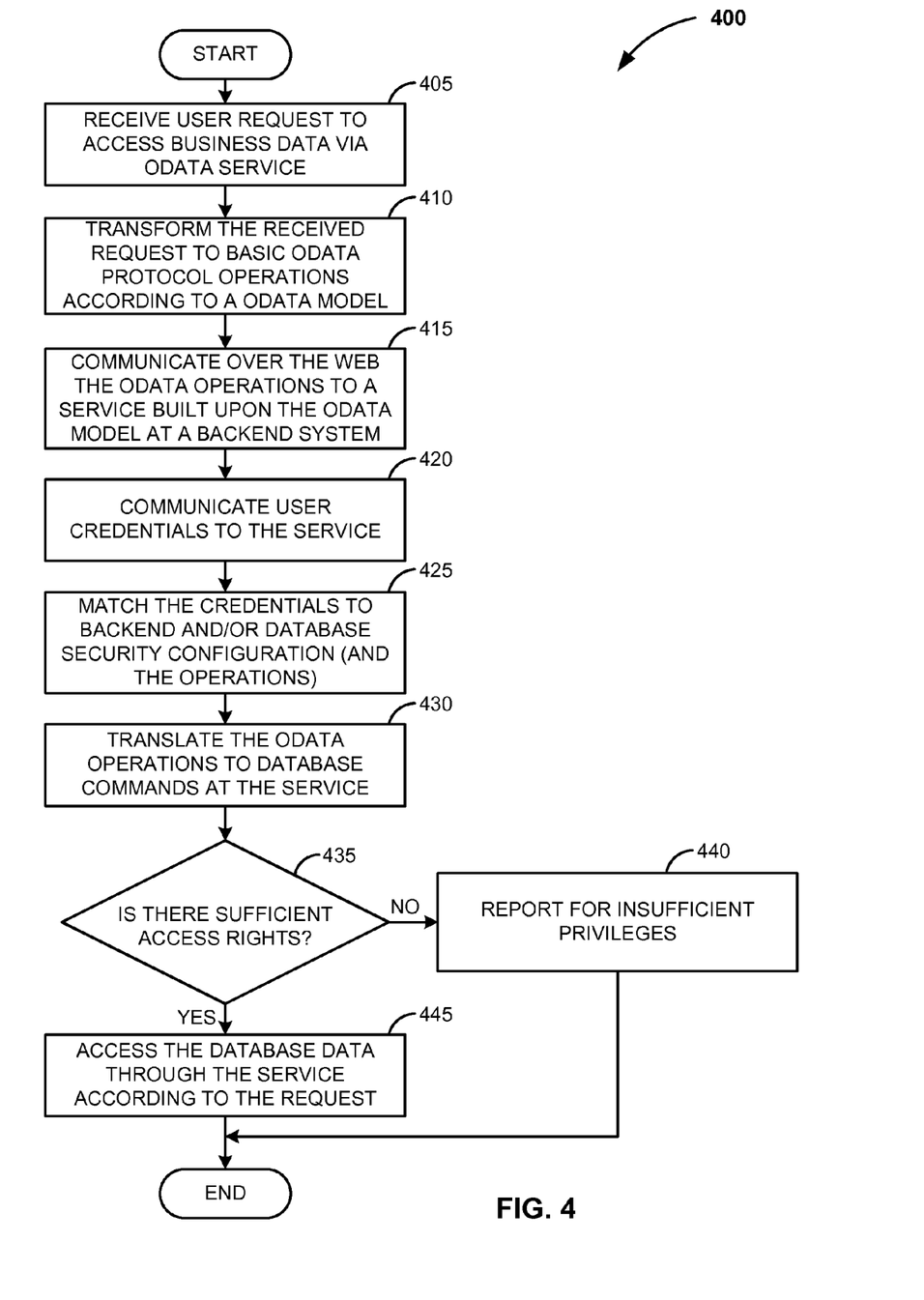
FIG. 4 is a flow diagram illustrating a process to access database content published at a backend system as a service, according to one embodiment.

FIG. 4 shows process 400 to accessing database content published at a backend system as a service, according to one embodiment. At 405, a user of a client application may request specific business data or information, e.g., in the context of particular activity. For example, the user may want to generate particular report including the requested data. In one embodiment, the client application forwards the request to the backend service through an OData based interface, via OData service. However, same principles would apply when different types of technology for data exchange are applied.

At 410, the received user request is transformed to series of basic OData operations, according to the OData model of the backend service as published. The OData operations may be as elementary as "read", "update", "create", "delete", etc. Further, the OData operations may define different queries to access the data of interest. The integration between the client application and the backed service is enabled by the applied OData mechanism, regardless the device or the development technology used to create and run the client application and the backend system.

At 415, the OData interface compliant operations are transferred to the backend service, built upon OData model at the backend system, over a public or private network, for example, the Web or the Internet, service provider private networks, e.g., provided by a mobile operator, etc. The operations may be transferred as HTTP headers of Uniform Resource Identifier (URI), and the data may be exchange in various formats adopted in the OData, such as, JavaScript Open Notation (JSON), 'Atom' (an eXtensible Markup Language (XML)-based Web content and metadata syndication format), etc.

In one embodiment, the access to the data as requested by the user is determined based on the user's authorization credentials, or in other words, what access rights the user is associated with. At 420, information about the access rights or the credentials of the user is communicated to the backend service, either separately or together with the OData operations. At 425, the user credentials could be matched to the security configuration of the backend (e.g., the backend service), or to the security configuration of the database, or both. Based on the implementation, the user rights are matched to the existing server site authorization definitions before or after translating the received OData operations to database commands at the backend service (or at the server application hosting the backend service), at 430.

At 435, it is verified whether the user has sufficient access rights to consume the data content as requested. In one embodiment, the security mechanism of the backend system, or the database storing the data, could include identifying what access role is assigned to the user, and what data access restrictions are associated with that role. If the access to the particular data of interest is restricted for that user role, e.g., if the user does not have sufficient access rights, the service may report insufficient privileges to the client application, at 440. When the access rights of the user are sufficient, the database content or data could be accessed, and eventually manipulated, according to the request, at 445.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 5:
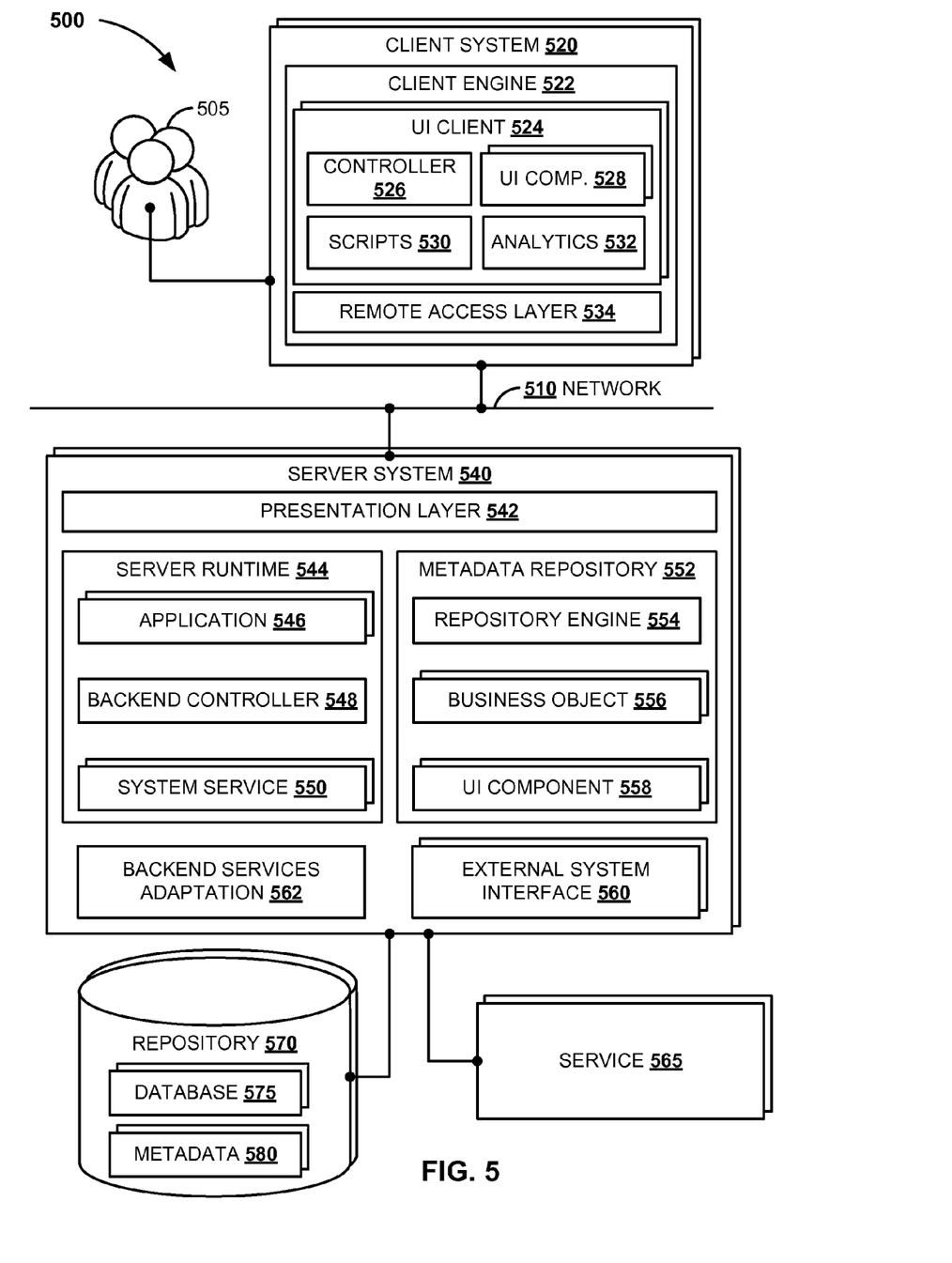
FIG. 5 is a block diagram illustrating a computer system landscape to publish and expose business data, according to one embodiment.

FIG. 5 is a block diagram showing computer system landscape 500 where database content is dynamically published and exposed as a service at a server endpoint, according to one embodiment. The computer system landscape 500 illustrates a rather simplified example of classic client-server architecture. One or more shareholders or users 505, e.g., software product designers, developers, quality assurance (QA) specialists, end users, managers, etc., operate on one or more client systems 520. Users 505 may request different services or execute various operations, as available within client systems 520, or as provided by one or more server systems 540 via network 510. The illustrated server systems 540 represent one or more backend nodes in the computer system landscape 500.

The client systems 520 and the server system nodes 540 communicating via network 510 may define a number of different computer system environments. Some of the elements of the computer system landscape 500 resemble the structure and functionality of software modules developed by SAP AG. However, structures with similar functionalities could be found in software products developed by other vendors, as well. Alternative embodiments may utilize other kinds of computer system architectures.

The involved client systems 520 may have similar or different structures where one or more of the illustrated modules are replicated. One or more users 505 may operate within one or more instances of user interface (UI) client 524 of one or more of the client systems 520. Different users 505 may exclusively access different instances of the UI client 524 within a same client system 520.

In one embodiment, any of client systems 520 may execute a standalone client application, e.g., client engine 522, to interact with the backend server system 540. Alternatively, an intermediate layer may be downloaded to any of the client systems 520 as an extension of a running Internet browser. Such intermediate layer may be also illustrated as client engine 522. The standalone client application and the intermediate layer may have similar components and functionality. Client engine 522 takes responsibility for rendering the necessary client functionality, and also for communicating with server systems 540 via network 510 when necessary. In one embodiment, the client system or systems 520 may provide access to the server system nodes 540 just through standard Internet browser applications.

The client engine 522 may include UI client instances or sessions 524 that may also embed into a browser integrated framework. The UI client 524 may be a part of any popular browser integrated framework, e.g. Silverlight® provided by Microsoft Corp, Flex® provided by Adobe Systems Inc., JavaFX® originally developed by Sun Microsystems Inc., etc. In one embodiment, the client engine 522 and UI client 524, respectively, may be desktop application, for example, a .NET® application rendering a UI through a Windows Prosecution Foundation (WPF) system. The UI client 524 may access the necessary business data at the backend 540 through remote access layer 534 via network 510. In one embodiment, no dedicated UI server or client programs are needed. The communication with the backend 540 may include extracting, storing and updating data. The data may be transported to repositories 570, especially when backend 540 implements a number of server nodes in separate computer system environments.

In one embodiment, users 505 generate services requests at UI client 524. UI components module 528 instantiates one or more appropriate graphical user interface (GUI) screens or controls in response to the user request. The behavior of the UI components is managed by controller 526. The controller 526 makes sure that all instantiated controls in the UI components 128 are initialized. The controller is also responsible for the execution of any configured operation triggered by events corresponding to the instantiated controls. In case when some of the operations involve execution of script segments, the controller 526 may trigger the execution of these scripts via scripts module 530. In one embodiment, scripts module 530 is a frontend scripting engine. Analytics module 532 may be used for frontend data processing when necessary.

In one embodiment, the backend 540 utilizes presentation layer 542 to connect to the Internet and/or to other public or private networks, and to provide access for the UI client sessions 524 to underlying business functions and data structures. For example, the presentation layer 542 may generate the UI object model underlying the UI controls instantiated in the UI components module 528 at the client systems 520. In one embodiment, presentation layer 542 may be part of the server runtime 544.

The server runtime 544 provides environment where one or more software applications 546 are executed. For example, the applications 546 may provide a number of business services for the users 505, where various operation requests related to the business services are created at client systems 520. The requests are translated to corresponding process tasks performed by the applications 546 executed in server runtime 544.

In one embodiment, the server runtime 544 includes backend controller 548 for one or more UI client sessions 524 to handle the requested UI components, e.g., when a UI client session 524 triggers an initialization of a UI component for the first time. The backend controller 548 may manage the collaboration between the requested UI components and one or more underlying business objects. System services 550 in the server runtime 544 may be used to administer the characteristics of the server runtime 544, e.g., its engine parameters, the user access to one or more components, the processes execution, the communication with other runtime environments, like, external systems, databases, etc. In one embodiment, system services 550 may also provide deployment, setup and change management of software components.

Metadata repository 552 is generally the place where metadata about the computer programs deployed in the server system 540 are preserved, according to one embodiment. There are different kinds of metadata that could be maintained by the metadata repository 552. For example, the repository 552 keeps the description of the business objects 556 underlying the applications 546. In one embodiment, metadata repository 552 keeps description of the available UI components 558 and the relationships between them as designed.

Repository engine 554 manages the metadata and the collaboration with the server runtime 544 at one hand, and with various service providers 565 at the other hand. The service providers 565 may render services and/or corresponding UI components to the backend 540 as defined in the metadata. The service providers 565 are available via service provider interfaces 560, and can be either internal or external to the backend 540. In one embodiment, backend services adaptation 562 represents a layer that helps to adjust the designed UI or rendered UI components to a set of normalized business objects available at the server system 540.

In a multi-server system environment, e.g., in a cluster of more than one server system nodes 540, repository 570 may be used to persist different kinds of common data, including programming code, business data, metadata, etc. In one embodiment, one or more different repositories 570 may be assigned to different computer system environments defined in the computer system landscape 500

In one embodiment, users 505 may design, create or change a program component, a data object or some other type of computer system artifact by manipulating UI components 528 associated with particular application or software tool. The UI components 528 may be available within GUI environment of the UI client 524. The manipulations of the UI components 128 may trigger execution of various system or application procedures in server runtime 544. For example, a user of users 505 may configure an OData based service provider by executing a business transaction using relevant UI components 528 corresponding to a business application (e.g., applications 546), according to one embodiment.

Further, the manipulations of the UI components 528 may lead to changes in the metadata repository 552, e.g., changes in the definitions of the UI components 558, even to changes in the descriptions of the business objects 556, etc. For example, by manipulating UI components 528 or by directly entering program code, a user 505 may create service model artifact for accessing business data, e.g., in development and/or in production computer system environments defined in landscape 500. The service model could be stored as artifact among other artifacts in repository 570, e.g., as metadata 580. Same or another user 505 may perform tests with the created service model prove its quality. In one embodiment, such tests may be performed in a separate environment defined in computer system landscape 500. The different environments in the landscape 500 could be logically, and even physically isolated, where each computer system environment may encompass separate server system nodes 540 different repositories 570 and even different client systems 520.

In one embodiment, a user 505 may access a database content publisher executed at server system 540 via UI client 524, manipulating UI components 528. The publisher may be a separate application 546, or a module of an application 546 executed in server runtime 544. For example, the publisher may be a module of a gateway application providing access to other applications 546 running on the server system 540. Alternatively, the publisher and/or the gateway could be provided externally to the server system, e.g., by one or more service providers 565. The company SAP AG provides NetWeaver® Gateway™ product as an internal plugin service 550 to server runtime 544 to enable various devices, environments and platforms to connect to business software applications provided by SAP in a simple way, based on market standards, such as OData.

The user 505 may access the gateway application and trigger the execution of a business transaction through the publisher. For example, the business transaction could be executed by one or more of the applications 546. The publisher, e.g., through one or more of system services 550 and/or backend services adaptation 562, could create a structure model of the data structures of database 575, including tables and relationships, accessed or otherwise involved in the execution of the business transaction. Based on the structure model, the publisher may generate OData service model and store it as an artifact in metadata 580. The user 505 may manipulate the generated OData service model at the publisher through the gateway to configure it or improve it for the potential consumers. In one embodiment, the gateway or other application 546 or external service 565 may refer to the created OData model to provide access to data content as identified by the executed business transaction. The access is provided as a service to be consumed by various client applications.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
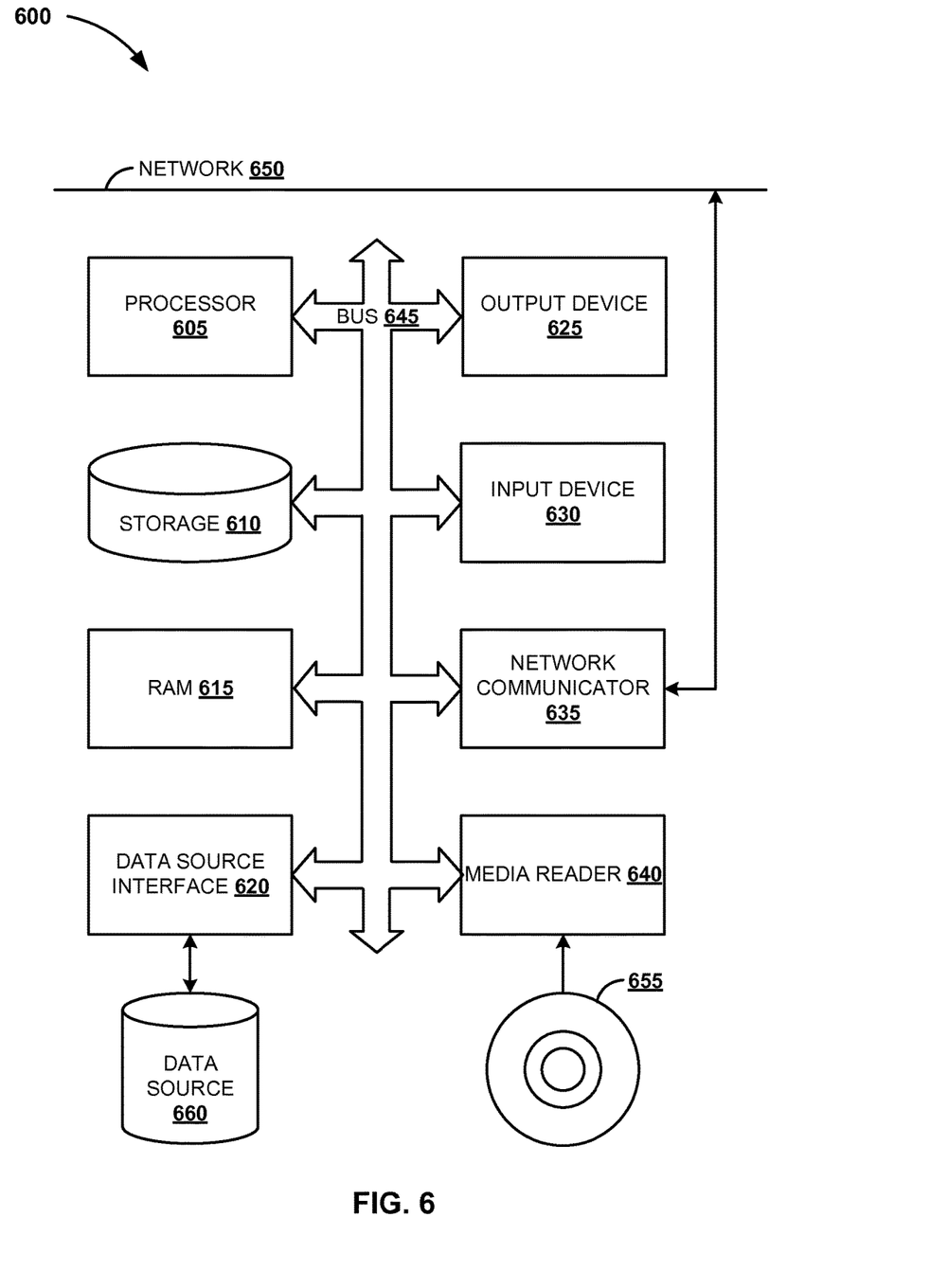
FIG. 6 is a block diagram of an exemplary computer system, according to one embodiment.

FIG. 6 is a block diagram of exemplary computer system 600, according to one embodiment. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system publishing database content, the system comprising:
   at least one processor;
   a memory storing a business transaction analyzer designed to perform operations comprising monitor an execution, by the at least one processor, of a business transaction, and to identify at least one database table of a plurality of database tables, wherein the at least one database table is referred by the business transaction;
   a publisher configured to perform operations comprising automatically generate a data structure model based on the identified at least one database table, and to expose, as a backend service via open data protocol, based on the data structure model, data of the at least one database table, wherein exposing the backed service is based on access rights defined on database field level, associated with the at least one database;
   modify the data structure model based on user input to re-generate the data structure model for accessing the data directly at the database field level, wherein the modification involves changing functional dependencies within the data structure model; and
   provide access to the data of the at least one database table in response to a request by a user to the backend service, wherein the request is transformed to a series of OData operations that define queries to access the data, and wherein rights of the user are matched to existing server site authorization definitions before or after translating the OData operations to database commands at the backend service.

2. The computer system claim 1 further comprising:
   a database relationship analyzer to identify at least one database relationship associated with the at least one database table of the plurality of database tables when a user associated with the business transaction is authorized to access the at least one database table.

3. The computer system of claim 1, wherein the publisher is configured to perform operations further comprising:
   generate an abstract data model based on the data structure model to define access to the data of the at least one database table; and
   construct a plurality of identifiers associated with the abstract data model to expose the data of the at least one database table.

4. The computer system of claim 1, wherein modifying the data structure model operations further comprising:
   split the data structure model into more than one service models; and
   re-generate the service models to implement the modifications.

5. A non-transitory computer-readable storage medium comprising instructions that, when executed by at least one processor of a machine, cause the machine to perform operations comprising:
   run a business transaction within an application server;
   identify at least one database table of a plurality of database tables, wherein the at least one database table is referred by the business transaction;
   identify at least one database relationship including the at least one database table of the plurality of database tables;
   automatically generate a data structure model based on the identified at least one database table and the identified at least one database relationship;
   expose, as a service via open data protocol based on the data structure model, data of the at least one database table, wherein exposing the service is based on access rights defined on database field level, associated with the at least one database;

modify the data structure model based on user input to re-generate the data structure model for accessing the data directly at the database field level, wherein the modification involves changing functional dependencies within the data structure model; and provide access to the data of the at least one database table in response to a consumer request to the service, wherein the request is transformed to a series of OData operations that define queries to access the data, and wherein user rights are matched to existing server site authorization definitions before or after translating the OData operations to database commands at the service.

6. The storage medium of claim 5, wherein identifying the at least one database table comprises:

verify a right to access the at least one database table for a security role assigned to a user associated with the business transaction, based on a predefined database security configuration.

7. The storage medium of claim 6 further comprising:

split the data structure model into more than one service models; and re-generate the service models to implement the modifications.

8. The storage medium of claim 5, wherein exposing the data comprises:

generate an abstract data model based on the data structure model to define access to the data of the at least one database table; and construct a plurality of identifiers associated with the abstract data model to expose the data of the at least one database table.

9. The storage medium of claim 5 further comprising:

verify a right to access the at least one database table for a security role assigned to a user associated with the consumer request, based on a predefined database security configuration.

10. A computer implemented method to publish database content, the method comprises:

executing a business transaction by at least one processor of the computer;

identifying, at a memory, at least one database table of a plurality of database tables, wherein the at least one database table is referred during the execution of the business transaction;

identifying at least one database relationship involving the at least one database table of the plurality of database tables;

automatically generating, by the processor, a data structure model based on the identified at least one database table and the identified at least one database relationship;

exposing, as a service via open data protocol based on the data structure model, data of the at least one database table to a consumer, wherein exposing the service is based on access rights defined on database field level, associated with the at least one database;

modifying the data structure model based on user input to re-generate the data structure model for accessing the data directly at the database field level, wherein the modification involves changing functional dependencies within the data structure model; and providing access to the data of the at least one database table in response to a consumer request to the service, wherein the request is transformed to a series of OData operations that define queries to access the data, and wherein user rights are matched to existing server site authorization definitions before or after translating the OData operations to database commands at the service.

11. The method of claim 10, wherein identifying the at least one database table comprises:

verifying a right to access the at least one database table for a security role assigned to a user associated with the business transaction, based on a predefined database security configuration.

12. The method of claim 10, wherein modifying the data structure model comprises:

splitting the data structure model into more than one service models; and re-generating the service models to implement the modifications.

13. The method of claim 10, wherein exposing the data comprises:

generating an abstract data model based on the data structure model to define access to the data of the at least one database table; and constructing a plurality of identifiers associated with the abstract data model to expose the data of the at least one database table.

14. The method of claim 10, wherein providing access to the data comprises:

configuring the access to the data of the at least one database table based on a security role assigned to a user associated with the consumer request, according to a predefined database security configuration.

* * * * *